(12) United States Patent
Wall

(10) Patent No.: US 12,208,683 B2
(45) Date of Patent: Jan. 28, 2025

(54) DISPLAY DEVICE AND MOTOR VEHICLE HAVING A DISPLAY DEVICE

(71) Applicant: AUDI AG, Ingolstadt (DE)

(72) Inventor: Christian Wall, Hitzhofen (DE)

(73) Assignee: AUDI AG, Ingolstadt (DE)

( * ) Notice: Subject to any disclaimer, the term of this patent is extended or adjusted under 35 U.S.C. 154(b) by 815 days.

(21) Appl. No.: 17/295,279

(22) PCT Filed: Mar. 12, 2020

(86) PCT No.: PCT/EP2020/056673
§ 371 (c)(1),
(2) Date: May 19, 2021

(87) PCT Pub. No.: WO2020/229022
PCT Pub. Date: Nov. 19, 2020

(65) Prior Publication Data
US 2022/0001745 A1    Jan. 6, 2022

(30) Foreign Application Priority Data
May 14, 2019   (DE) ..................... 10 2019 206 935.5

(51) Int. Cl.
*G06F 1/16*    (2006.01)
*B60K 35/00*   (2006.01)
(Continued)

(52) U.S. Cl.
CPC .............. *B60K 35/00* (2013.01); *B60K 35/10* (2024.01); *B60K 35/22* (2024.01); *B60K 35/223* (2024.01);
(Continued)

(58) Field of Classification Search
None
See application file for complete search history.

(56) References Cited

U.S. PATENT DOCUMENTS

| 4,221,419 A | 9/1980 | Riley et al. |
| 9,864,412 B2 * | 1/2018 | Park ..................... G06F 1/1652 |

(Continued)

FOREIGN PATENT DOCUMENTS

| CN | 102141878 A | 8/2011 |
| CN | 105452045 A | 3/2016 |

(Continued)

OTHER PUBLICATIONS

German Examination Report dated Dec. 6, 2019, in German Patent Application No. 10 2019 206 935.5, 8 pages.

(Continued)

*Primary Examiner* — Imani N Hayman
*Assistant Examiner* — Rashen E Morrison
(74) *Attorney, Agent, or Firm* — STAAS & HALSEY LLP

(57) ABSTRACT

A display device includes a flexible screen device and a pivot mechanism. The flexible screen device is movable between a stowed position, in which the flexible screen device is bent along a circular arc and stowed in a housing, and a use position, in which the flexible screen device protrudes at least partially from the housing. The pivot mechanism is configured to move the flexible screen device between the stowed position and the use position, and includes a motor and a pivot arm. The pivot arm is rotatably mounted on a foot region of the flexible screen device so as to be pivotable about an axis of rotation. The pivot arm is configured to receive a torque from the motor to move the foot region along the circular arc. The flexible screen device is thereby alternately pushed into the use position and pulled into the stowed position.

20 Claims, 7 Drawing Sheets

(51) Int. Cl.
   *B60K 35/10* (2024.01)
   *B60K 35/22* (2024.01)
   *B60K 35/53* (2024.01)
(52) U.S. Cl.
   CPC ...... *B60K 35/53* (2024.01); *B60K 2360/1438* (2024.01)

(56) References Cited

U.S. PATENT DOCUMENTS

2012/0268665 A1  10/2012  Yetukuri et al.
2017/0349098 A1* 12/2017  Uhm .................. G02B 27/0101

FOREIGN PATENT DOCUMENTS

| DE | 101 15 050 | 10/2002 |
| DE | 10 2013 019 571 | 5/2015 |
| DE | 10 2014 016 323 | 5/2016 |
| DE | 10 2016 224 500 | 4/2018 |
| DE | 20 2017 007 042 | 5/2019 |
| DE | 10 2018 208 250 | 9/2019 |
| EP | 1 637 387 | 3/2006 |
| JP | 2007-126135 A | 5/2007 |
| WO | 2017/013000 A | 1/2017 |

OTHER PUBLICATIONS

International Search Report dated Jul. 1, 2020, in International Patent Application No. PCT/EP2020/056673, with PCT/ISA/220, PCT/ISA/210, PCT/ISA/237, 12 pages
International Patent Application No. PCT/EP2020/056673, Mar. 12, 2020, Christian Wall, Audi AG.
German Patent Application No. 10 2019 206 935.5, May 14, 2019, Christian Wall, Audi AG.
International Preliminary Report on Patentability dated Nov. 25, 2021, in International Patent Application No. PCT/EP2020/056673 (PCT/IB/338, PCT/ISA/237; PCT/IB/373) (7 pages).
Chinese Office Action dated May 31, 2023 for Chinese Application No. 202080005585.X.

* cited by examiner

DISPLAY DEVICE AND MOTOR VEHICLE HAVING A DISPLAY DEVICE

CROSS-REFERENCE TO RELATED APPLICATIONS

This application is a U.S. national stage of International Application No. PCT/EP2020/056673, filed on Mar. 12, 2020. The International Application claims the priority benefit of German Application No. 10 2019 206 935.5 filed on May 14, 2019. Both International Application No. PCT/EP2020/056673 and German Application No. 10 2019 206 935.5 are incorporated by reference herein in their entirety.

BACKGROUND

Described herein is a display apparatus (display device) for displaying pixel-based display content, including a flexible screen device and at least one pivot mechanism. The pivot mechanism is in each case configured to move the screen device, in dependence on a control signal, between a stowed position, in which the screen device is bent along a circular arc and stowed in a housing, and a use position, in which the screen device protrudes at least partially from the housing.

A flexible screen device as described herein includes a bendable screen device. In other words, the screen device as a whole can be bent. A bendable display surface or display layer of such a screen device can be implemented, for example, by a film and/or film layer arrangement and therefore is bendable. A bendable carrier layer for such a screen device can have structural and/or material bendability. Pixel-based display content includes display content composed of individual image elements, which can be displayed, for example, on an OLED-based (OLED—organic light emitting diode) or TOLED-based (TOLED—transparent OLED) display surface.

Display apparatuses having flexible screen devices are known in principle. The arrangement of a flexible screen in a stowed position and a use position is also known.

European Patent Application Publication 1 637 387 A1, for example, describes a display apparatus for a vehicle, including a flexible display. The display apparatus additionally has a housing and a stabilizing mechanism for the display in the form of a folding grille. A disadvantage of this display apparatus is that the elements of the folding grille must necessarily protrude above the edge of the display in a stowed position, which leads to an increased space requirement.

German Patent Application No. 101 15 050 A1 describes a display apparatus, in particular for vehicles. The described display apparatus has a flat screen which consists of flexible material. When the screen is moved into a viewing position, it is transported curved over a roller. When the screen is in a free viewing position it is provided that the screen assumes a predefined shape, without the flexibility of the screen being limited. Guiding over a roller has the disadvantage that, when constructing a new model with different dimensions, a radius of curvature of the screen can be varied only with a high outlay in terms of construction, since all the parts connected to the roller must be newly dimensioned. In addition, transport over a roller necessarily leads to increased wear of the rear side of the screen.

German Patent Application No. 10 2014 016 323 A1 also describes a display apparatus for a motor vehicle having a flexible display device and an adjusting device. Here too, the display device is configured to be moved from a stowed position into a use position. It is thereby bent, so that a display surface of the display apparatus is bent in the use position. The bent display surface has the disadvantage that display content is represented in a distorted manner in case of doubt and the display surface is not clearly visible to all occupants of the vehicle.

SUMMARY

Described herein is a display apparatus which allows display surface sizes of different sizes to be adjusted, wherein the display apparatus has a small space requirement and is also to be able to be adapted to changing installation conditions without a high outlay in terms of construction.

This may be achieved by the display apparatus having features described herein. Advantageous further developments are further described herein according to the following description and the drawings.

Described herein is a display apparatus for displaying pixel-based display content. The display apparatus includes a flexible screen device and at least one pivot mechanism. The at least one pivot mechanism is configured to move the screen device, in dependence on a control signal, between a stowed position and a use position. According to the display apparatus described herein it is provided that in the stowed position the screen device is bent along a circular arc and stowed in a housing. In the use position, the screen device protrudes at least partially from the housing. In other words, the screen device in the stowed position is stowed in the housing so that it is not visible from the outside, and in the use position at least a portion of the screen device is visible because it protrudes from the housing. In the stowed position, the screen device thus has a curvature. The curvature can thereby follow an outer shape of the housing, which can be constant or irregular. It can be provided that the screen device has one, two or generally a plurality of pivot mechanisms. The use of a plurality of pivot mechanisms is suitable for making possible the movement of a large and/or heavy screen device.

The at least one pivot mechanism of the display apparatus described herein has in each case a motor and a pivot arm. A motor can be, for example, an electric motor which is connected to an external power supply. The pivot arm is rotatably mounted at one end region, that is to say at a terminal region, on a foot region of the screen device and is mounted at an opposite end region so as to be pivotable about an axis of rotation. For this purpose, the pivot arm can be elongated or rod-shaped and have two end regions which are opposite one another. The two end regions can be the two ends of the pivot arm. One end of the pivot arm is thus rotatably mounted on a foot region of the screen device. In other words, one end of the pivot arm is arranged in a region of the screen device that, in the use position, in which the screen device, as described, protrudes at least partially from the housing, is closest to the housing or still remains in the housing. The rotatable mounting allows the pivot arm end at the foot region of the screen device to roll or twist. At the opposite end, the pivot arm is mounted so as to be rotatable about an axis of rotation, for example on the motor or on a transmission which couples the pivot arm with the motor. Mounting can thus be implemented directly, for example on a shaft of the motor, or indirectly, for example via a gear assembly of a transmission.

The pivot arm is configured to receive a respective torque from the motor and thereby move the foot region along the circular arc, the radius of which accordingly corresponds to a length of the pivot arm, and thereby alternately (that is to say according to the pivot direction of the pivot arm) push (deploy) the screen device into the use position and pull (retract) it into the stowed position in a displacement direction. In other words, a torque of the motor is transmitted to the pivot arm, whereby the pivot arm performs a pivot movement. The torque of the motor is thereby transmitted to the foot region of the screen device as a pushing force or pulling force. As a result of this torque transmission or directional force transmission from the motor to the foot region of the screen device, the screen device is alternately pushed out of the housing into the use position and pulled into the housing into the stowed position. The rotational direction of the torque of the motor changes between two opposite directions for this purpose.

The pivot mechanism having a motor and a pivot arm that is provided has the advantage that, by replacing a single component, namely the pivot arm, it is possible to respond to different installation space situations. The length of the pivot arm directly defines the radius of the circular arc for the stowed position. Moreover, the pivot mechanism that is provided has the advantage that the screen device must be connected to the pivot arm only in places. The rear side of the screen device is not loaded over its entire surface, as would occur, for example, in the case of guiding over a roller. In addition, the display apparatus has the advantage that the screen device can be stowed bent along the circular arc and thus in a space-saving manner.

The display apparatus also includes embodiments which result in additional advantages.

As has already been stated, it is provided that the display apparatus has a housing. According to an advantageous embodiment, the at least one pivot mechanism is arranged inside the housing and is designed to push the screen device continuously variably, in dependence on the control signal, from the stowed position into at least one intermediate position and to hold it in that position. In other words, it is provided that the screen device can assume and maintain any number of or a predetermined step number of positions between the stowed position and the terminally or completely deployed use position. Accordingly, there is a plurality of deployment steps or deployed positions, that is to say two or more than two. This has the advantage that a specific screen size can be established or adjusted as required. The housing can enclose the at least one pivot mechanism and the screen device wholly or partially. The housing may have a slot through which the screen device is pushed from the stowed position into the use position or an intermediate position and is pulled in the opposite direction back into the stowed position.

According to an advantageous further development, the screen device has a carrier layer and a display layer which are bonded together to form a flexible layer composite. The carrier layer is, for example, provided with notches on its rear side. In other words, the carrier layer may have notches on a surface remote from the display layer. According to the described further development, the carrier layer is configured to be curved, wherein the notched surface has a smaller radius of curvature in a curved position than the surface opposite the notched surface and bonded to the display layer. In other words, the carrier layer may be provided with a structure on the rear side. The structure can have notches and/or ribs. The notches and/or ribs advantageously extend along the rear side of the carrier layer in a direction extending perpendicularly to a displacement direction. The displacement direction is the direction in which the screen device is pushed and pulled in order to be moved into the use position or stowed position, respectively. The notches and/or ribs give rise to the advantage of structural flexibility or bendability of the carrier layer, wherein the material of which the carrier layer is formed can in principle have inherent stiffness. The inherent stiffness of the carrier layer advantageously makes it possible that the carrier layer prevents the entire screen device from falling over or rippling in the use position without additional stabilizing features being necessary.

Bonding between the carrier layer and the display layer can be implemented, for example, by an adhesive layer. An adhesive layer has the advantage that an adhesive has damping properties and is able to absorb a shear force in order, for example, to compensate or absorb a relative movement between the carrier layer and the display layer. Bonding between the carrier layer and the display layer can, however, also take place in any other expedient manner.

It can be provided that the screen device in the stowed position is held mechanically preloaded in a bent position and in the use position is mechanically relaxed and thereby straight or flat. In other words, the screen device is fixed in a bent position inside the housing by a force acting on the screen device from the outside. The force acting from the outside can be exerted on the screen device by, for example, the housing wall and/or a roller and/or lateral guide rails. In the use position, that is to say in a position partially moved out of the housing, this force no longer acts and the screen can assume a straight or flat shape. This has the advantage that additional components do not have to be provided for unbending the screen when it leaves the housing. Unbending or straightening of the screen device takes place automatically in that the screen device, on leaving the housing, is automatically freed of the force that holds it in the bent position. Irrespective thereof, it can also be provided to attach additional guide elements at the housing exit which assist with the unbending or straightening of the screen device.

In a further advantageous embodiment of the display apparatus it is provided that the screen device has a touch-sensitive sensor layer. In other words, the display layer of the screen device has a touch-sensitive sensor layer which is arranged on the display layer. Accordingly, the screen device can generally be a touchscreen. In other words, the screen device may be a touchscreen, wherein, by use of the touch-sensitive sensor layer, which is likewise flexible, touches on the screen device can be detected and converted into corresponding control signals.

According to an advantageous further development, the display apparatus has at least one stabilizing element which is of variable length or can be adapted in terms of its length. The stabilizing element in a first end region is connected to the screen device and in an opposite second end region is rotatably mounted about an axis of rotation. The stabilizing element is designed, on movement of the screen device between the stowed position and the use position, to adapt in terms of its length to the respective one of the positions. The stabilizing element is further configured to support the screen device against a force acting along the axis of rotation. In other words, a movement of the screen device between the stowed position and the use position causes the stabilizing element of variable length concomitantly to be alternately deployed and retracted again automatically. For this purpose, the stabilizing element may be, for example, arranged with one end at a head region of the screen device arranged opposite the foot region of the screen device, that is to say at the upper edge of the screen device. The stabilizing element of variable length may be in the form of a passive element. As a passive element, it is moved concomitantly with the movement of the screen device. However, it can also be provided that the stabilizing element of variable length is in the form of an active element which by use of its own drive can actively assist with the movement of the screen device. This can be advantageous in the case of a particularly large and/or heavy screen device. In general, the stabilizing element has the advantage that the screen device can be stabilized against a pressing force acting on a screen surface and can accordingly be used as a touchscreen user interface.

According to an advantageous further development, the stabilizing element is guided in the head region of the screen device in an oblong hole extending perpendicularly or obliquely to the above-described displacement direction of the screen device. The first end region of the stabilizing element can, for example, slide in the oblong hole extending perpendicularly or obliquely to the displacement direction of the screen device. This has the advantage that the screen device can be stowed in the stowed position in a particularly space-saving manner. In order to ensure reliable sliding of the stabilizing element in the oblong hole when the screen device is moved and to prevent canting, it must be ensured that the stabilizing element does not slide beyond a predetermined point inside the oblong hole. This can be implemented, for example, by use of a mechanical or magnetic stopper arranged in the oblong hole.

According to an advantageous further development, the oblong hole has the shape of a roof. In other words, the oblong hole is not arranged parallel to an upper edge of the screen device but includes two segments which meet at a vertex. The stabilizing element thereby slides along in the first end region in a segment or leg of the roof-shaped oblong hole. This has the advantage that the mentioned canting is prevented particularly successfully and the mentioned stopper in the oblong hole can be omitted.

In another advantageous further development, the stabilizing element may be in the form of a telescopic arm. Such a telescopic arm can include two or more sections which can be moved into and out of one another in the manner of a telescope in order to implement variability of the length of the stabilizing element. This has the advantage that the stabilizing element can be stowed in a particularly space-saving manner.

Also described herein is a motor vehicle having an embodiment of the display apparatus described herein.

The motor vehicle described herein may be in the form of an automotive vehicle, for example, in the form of a passenger car or lorry, or in the form of a bus.

The display apparatus and motor vehicle described herein also include the combinations of the features of the described embodiments.

BRIEF DESCRIPTION OF THE DRAWINGS

These and other aspects and advantages will become more apparent and more readily appreciated from the following description of example embodiments, taken in conjunction with the accompanying drawings, of which.

DETAILED DESCRIPTION

Figure 1:
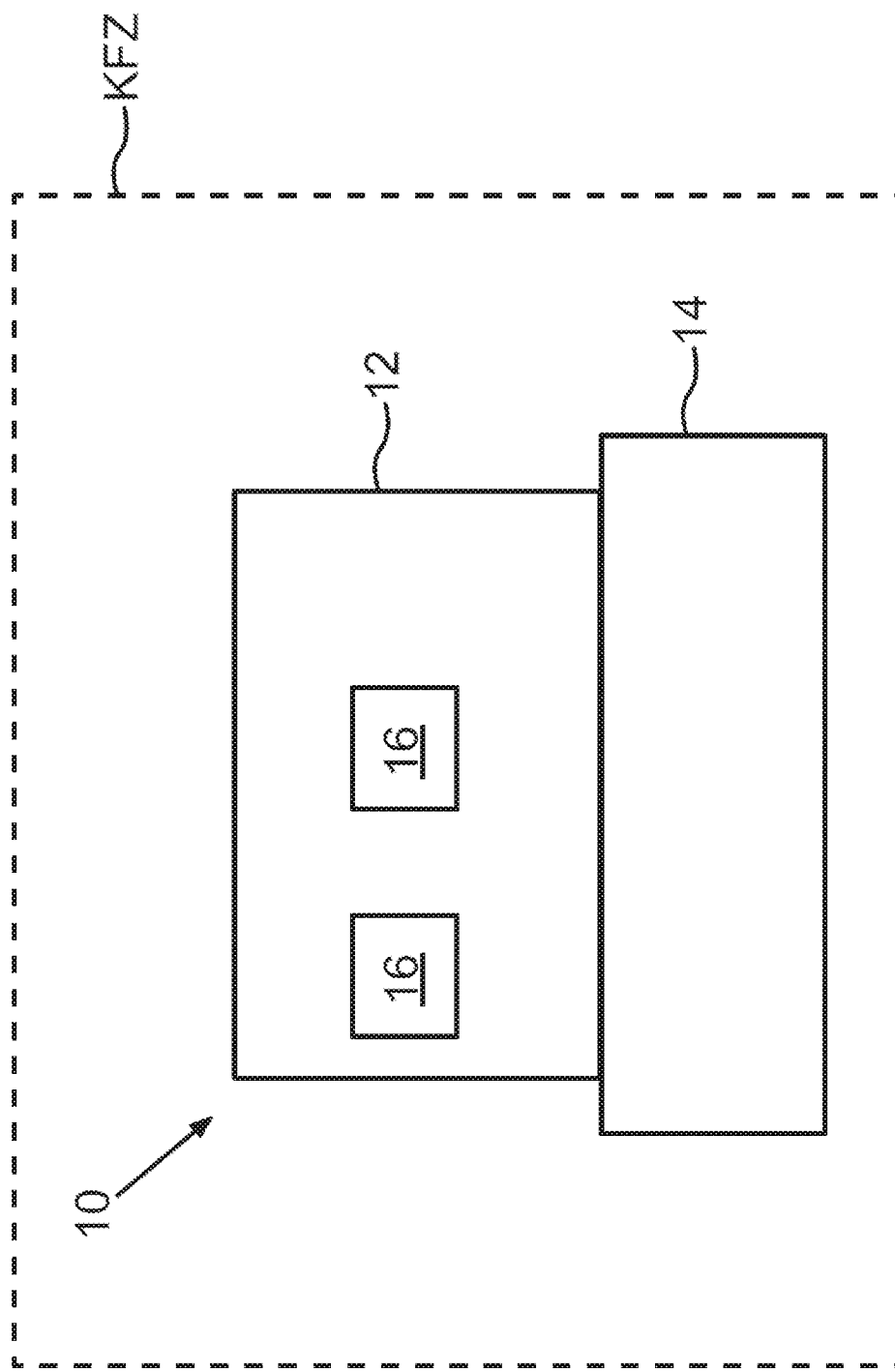
FIG. 1 is a schematic front view of a display device according to an example in a use position.

The example embodiments explained herein are examples of the disclosure. In the example embodiments, the described components of the embodiments each represent individual features which are to be considered independently of one another and which also each develop the disclosure further independently of one another and are thus also to be regarded as parts of the disclosure individually or in a combination other than the combinations shown. Furthermore, the described embodiments can also be supplemented by further features which have already been described.

Reference will now be made in detail to examples which are illustrated in the accompanying drawings. In the drawings, elements having the same function are each denoted by the same reference symbols or characters.

FIG. 1 shows a display apparatus 10 according to an example having a screen device 12 and a housing 14. In the front view of the display apparatus 10 shown in FIG. 1, pixel-based display content 16 is also shown. The display apparatus 10 can be fitted in a motor vehicle KFZ, for example in an instrument panel. The housing 14 can be arranged sunk in a trim panel and the screen device 12 can be deployed into an interior of the motor vehicle KFZ through a slot in the housing 14. During a journey of the motor vehicle KFZ, the portion of the screen device 12 that is deployed can be varied in a plurality of steps in order to adjust a size of the visible screen surface of the screen device 12 that is adapted to requirements and/or dependent on the driving mode.

Figure 2:
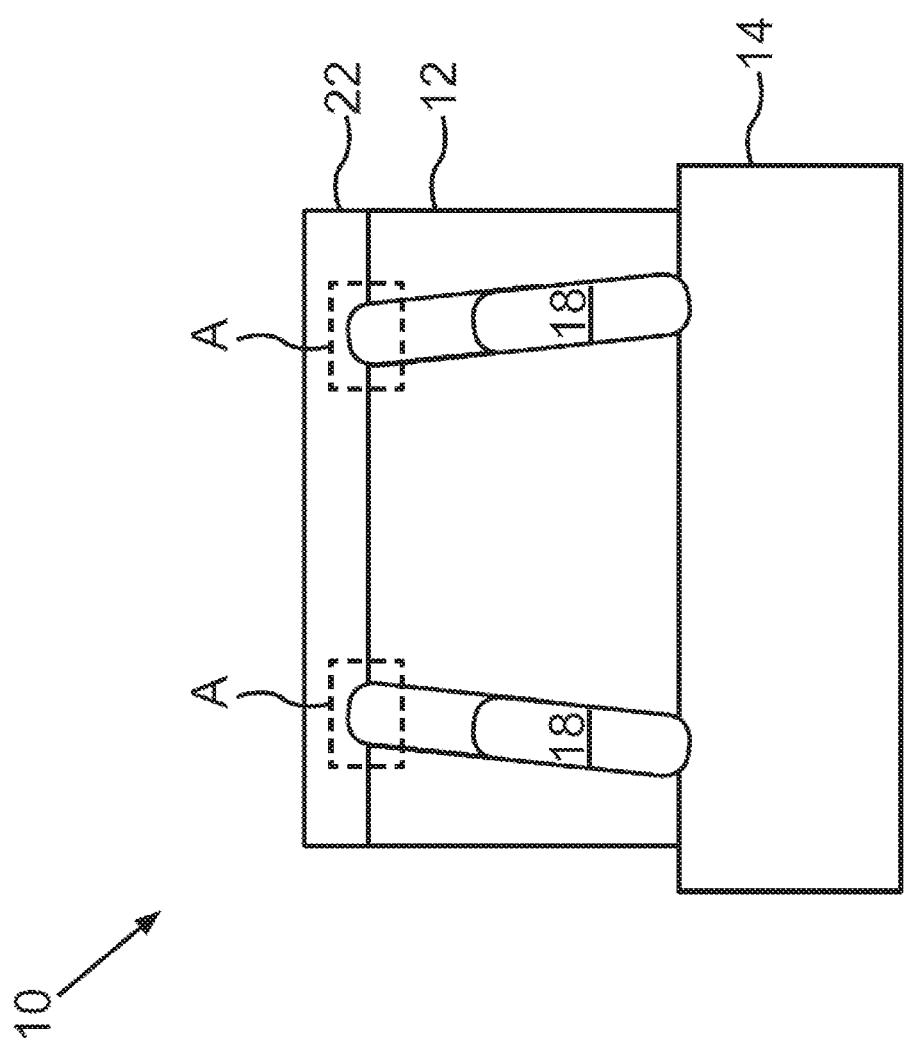
FIG. 2 is a schematic rear view of a display apparatus according to an example in the use position.

FIG. 2 shows a display apparatus 10 according to an example in a rear view. In addition to the components described in connection with FIG. 1, FIG. 2 shows two stabilizing elements 18, wherein each one of the stabilizing elements 18 is in the form of a telescopic arm. Each one of the stabilizing elements 18 is connected in a first end region A to a head region 22 of the screen device 12.

Figure 3:
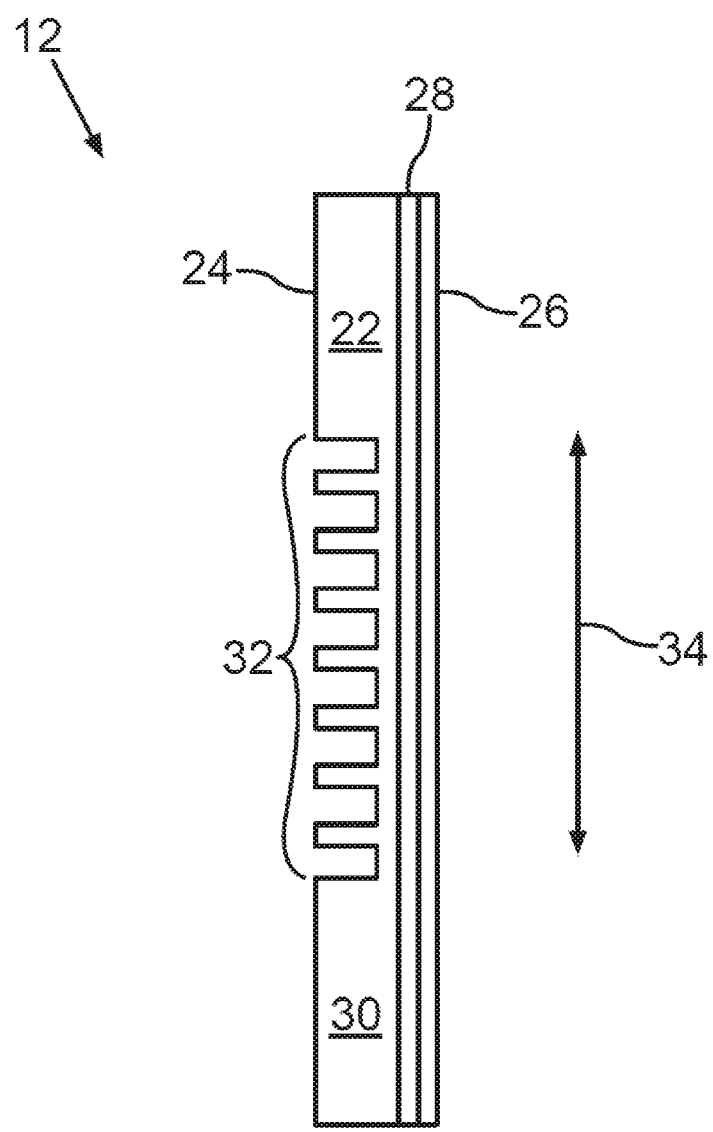
FIG. 3 is a schematic side view of a screen device.

FIG. 3 is a side detail view of a screen device 12. The screen device 12 has a carrier layer 24, a display layer 26 and a bonding layer 28 which bonds the carrier layer and the display layer. The bonding layer 28 in the embodiment shown here is in the form of an adhesive layer. The carrier layer 24 has a head region 22 and a foot region 30. Between the head region 22 and the foot region 30 there is arranged a notched region 32. The notched region 32 in the example embodiment shown here has notches and ribs. The notches and ribs extend along the rear side of the carrier layer 24 obliquely or perpendicularly with respect to a displacement direction 34. The carrier layer 24 is thus bendable or flexible in the notched region 32, whereas in the head region 22 and the foot region 30 the carrier layer 24 has high inherent stiffness.

Figure 4:
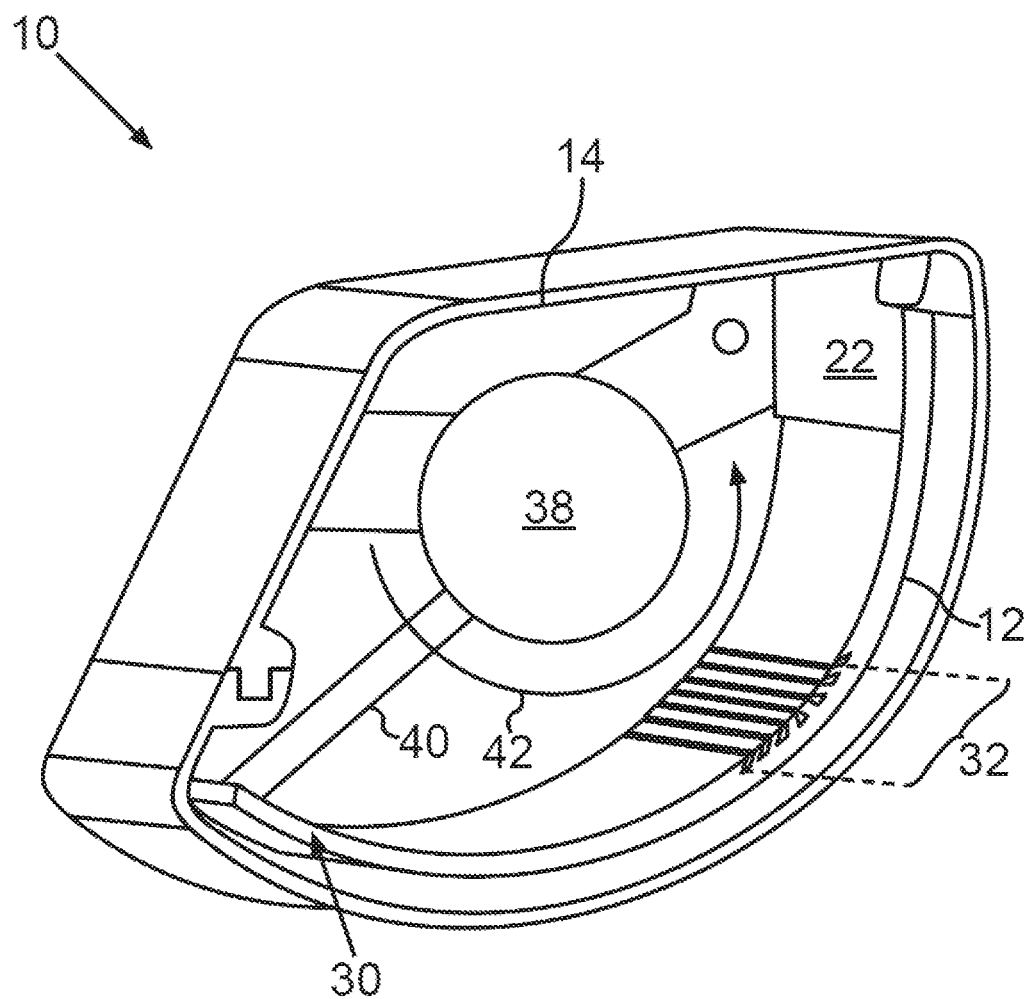
FIG. 4 is a schematic side view of a display apparatus according to an example in a stowed position.

FIG. 4 is a schematic side view of a display apparatus 10 according to an example, wherein the screen device 12 is in a curved stowed position in the housing 14. With reference to the components described in connection with FIGS. 1 to 3, FIG. 4 shows the screen device 12 bent along a circular arc and stowed in a housing 14. In the embodiment shown here, a pivot mechanism having a motor 38 and a pivot arm 40 is shown inside the housing 14. The pivot arm 40 is rotatably arranged at one end region on the foot region 30 of the screen device 12. Furthermore, the pivot arm 40 is adapted to receive a torque 42 from the motor 38. For this purpose, the pivot arm 40 can, for example, either be rigidly connected to the shaft of the motor 38 and thus receive the torque 42, or the pivot arm 40 can be connected to the motor 38 via a gear assembly in order to receive the torque 42. The pivot axis of the pivot arm 40 is fixed with respect to the housing 14. In the embodiment shown here, the screen device 12 is stowed inside the housing 14 in a curved manner, whereby mechanical preloading in the screen device 12 is established.

Figure 5:
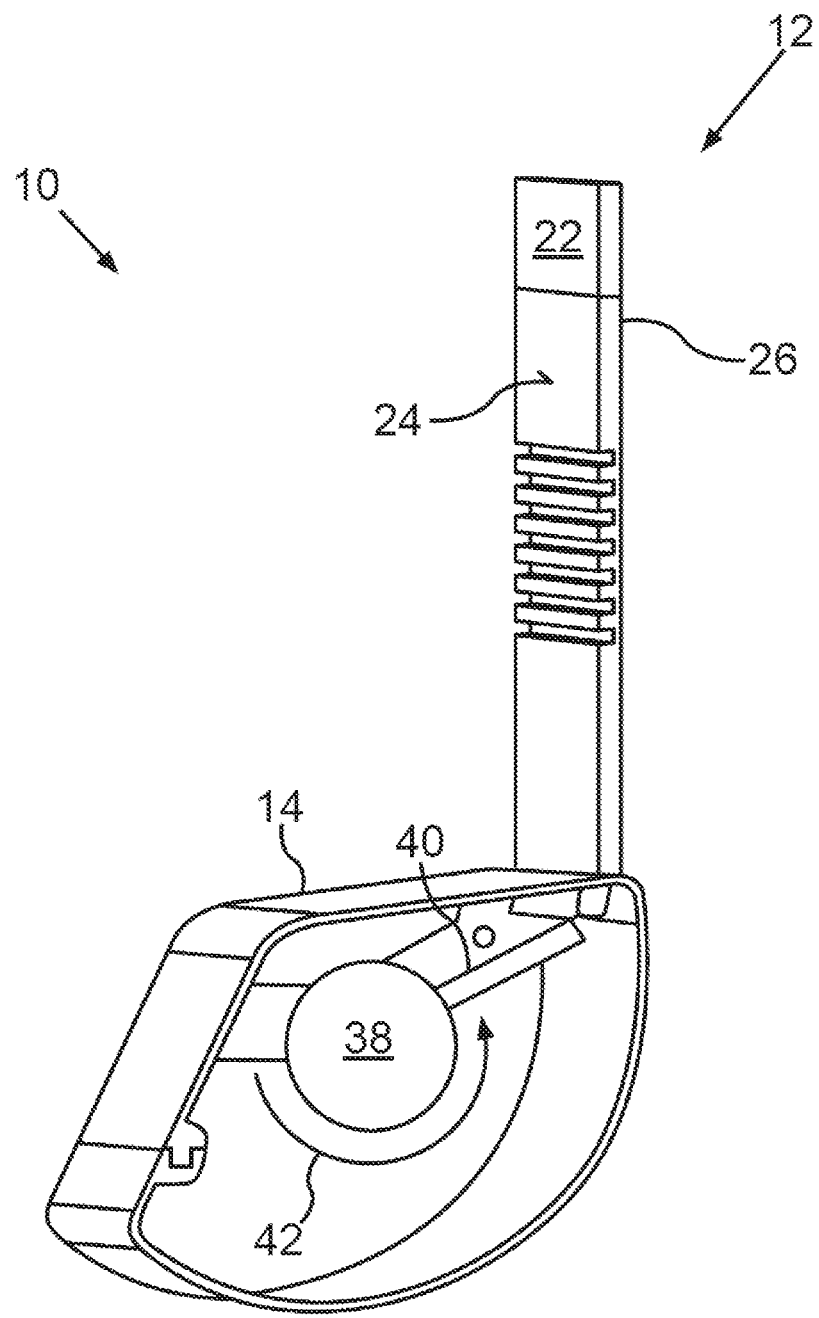
FIG. 5 is a schematic side view of a display apparatus according to an example in a use position.

FIG. 5 shows, with reference to the components described in connection with FIGS. 1 to 4, an embodiment of the display apparatus 10 according to an example, wherein the screen device 12 in the embodiment shown here is in a use position in which it is at least partially deployed from the housing 14. As a result of leaving the housing 14, the force exerted on the screen device 12 by the housing 14 and which held the screen device 12 in a mechanically preloaded manner inside the housing 14 ceases. In the use position shown in FIG. 5, the screen device 12 can accordingly unbend automatically.

Figure 6:
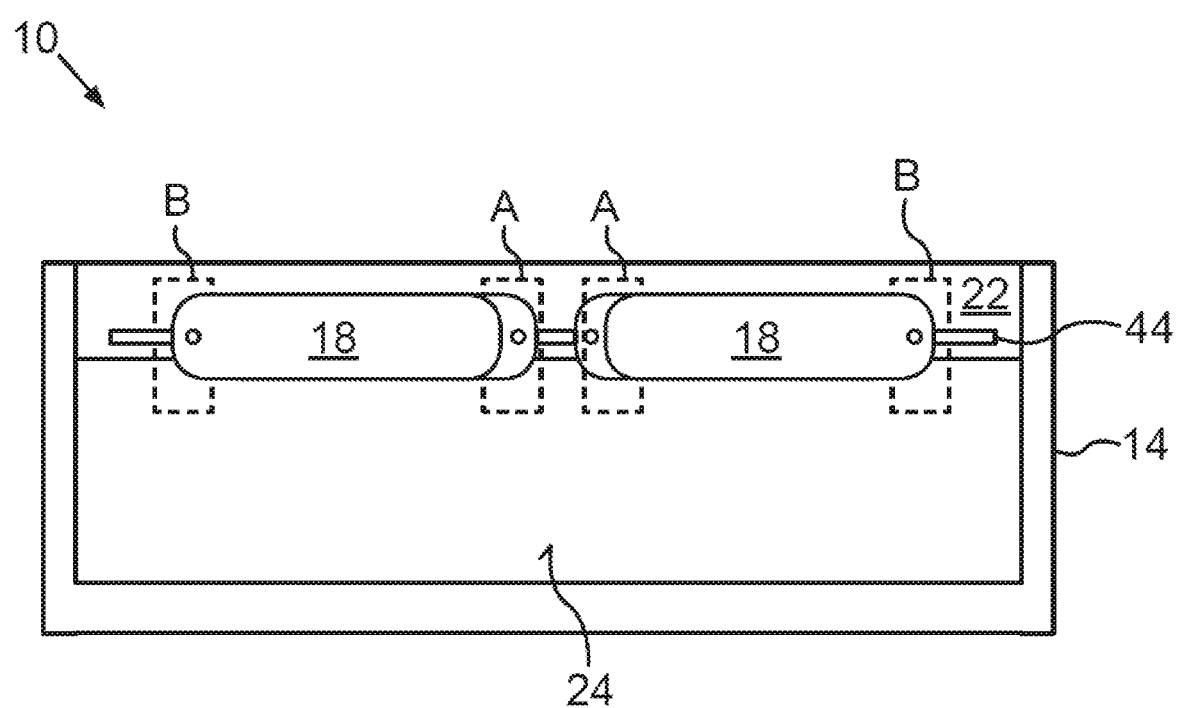
FIG. 6 is a schematic rear view of a display apparatus according to an example in a stowed position with folded in and retracted stabilizing elements.
Figure 7:
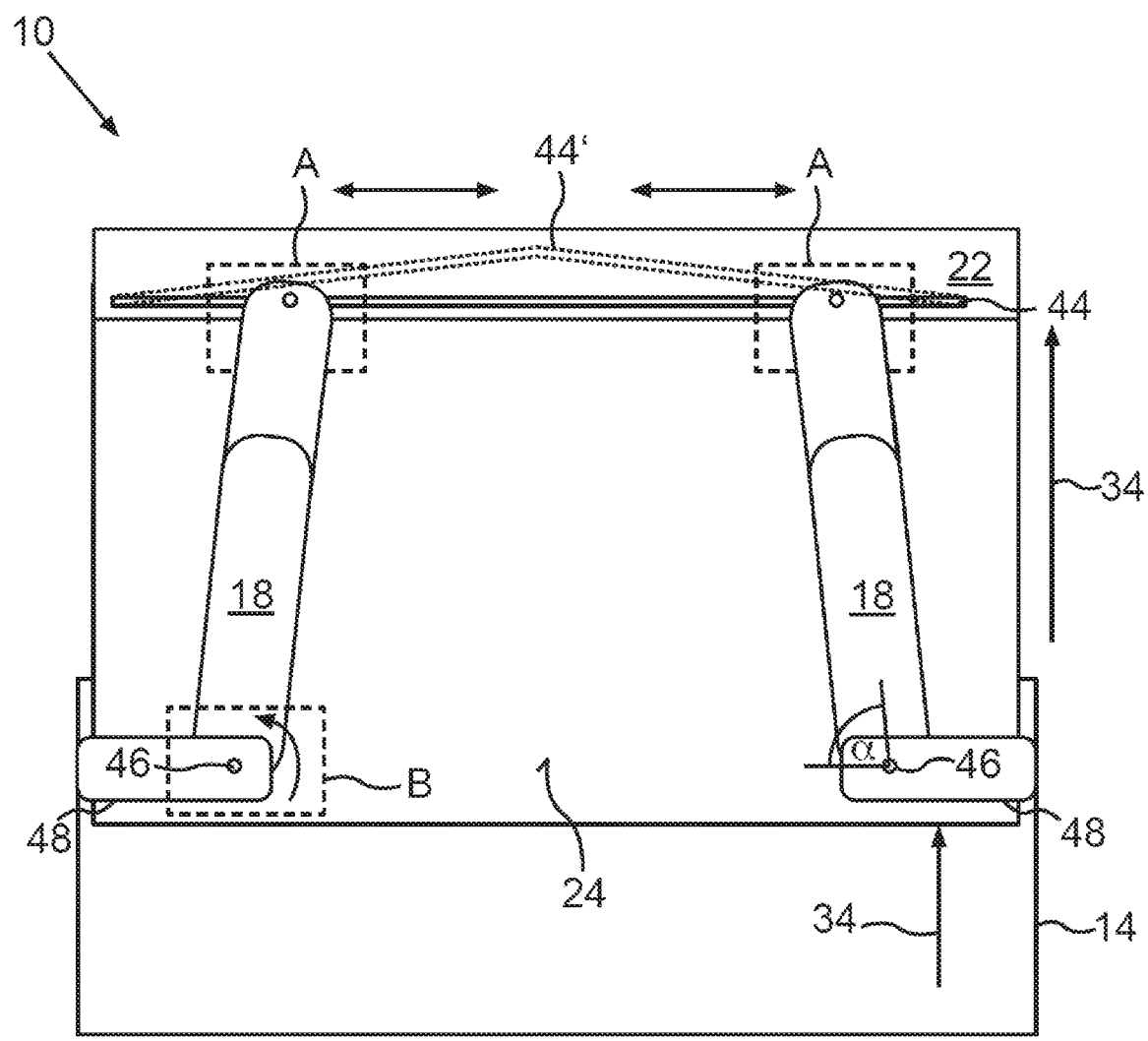
FIG. 7 is a schematic rear view of a display apparatus according to an example in a use position with folded out and deployed stabilizing elements.

FIGS. 6 and 7 are rear views of the display apparatus 10 according to an example. In the embodiments shown in FIGS. 6 and 7, the display apparatus 10 has two stabilizing elements 18, which are each of variable length in the form of telescopic arms. In a respective first end region A, each one of the stabilizing elements 18 is arranged in an oblong hole 44 arranged in the head region 22 of the screen device 12. The respective end regions A can be inserted into the oblong hole 44 with a pin, for example. With a respective second end region B arranged opposite the respective first end region A, the stabilizing elements 18 are rotatably mounted about respective axis of rotation elements 46 (see FIG. 7). The axis of rotation elements 46 are thereby each fixedly connected to the housing 14 by use of a connecting element 48 (see FIG. 7). Each axis of rotation element 46 can be in the form of a rod or pin in order to be able to transmit a force acting parallel to the axis of rotation of the stabilizing elements 18 to the housing 14. The stabilizing elements 18 accordingly cannot tilt.

If, as is shown in FIG. 7, the screen device 12 is then pushed in the displacement direction 34 out of the stowed position into the use position, the stabilizing elements 18 are extended from the rest position shown in FIG. 6 into a stabilizing position. In the course of this movement, the stabilizing elements 18 slide apart with their respective first end region A along the oblong hole 44. In a terminal use position, an angle $\alpha$ may not exceed a value of 90°. In order to avoid this angle being exceeded there can be arranged inside the oblong hole 44 at corresponding positions, for example, mechanical and/or magnetic stoppers, not shown. According to one possible embodiment, it can also be provided to configure the oblong hole 44 to be roof-shaped, in order to prevent canting of the stabilizing elements 18 in the oblong hole 44 even without stoppers. The described roof-shaped oblong hole 44' is illustrated by broken lines.

FIGS. 6 and 7 show how, by use of the stabilizing elements 18 described herein, a dead point or self-blocking can be prevented constructionally and at the same time easy running is ensured.

Displays or screen devices are increasingly being used in vehicles and are becoming design elements. Displays that are as large as possible are to be represented and their size can be varied use case dependently (that is to say as required, for example manual or piloted driving). It is further desirable to present displays in an attractive manner. Permanently installed rigid displays significantly determine the architecture of a control panel.

The possible size and position in the vehicle of permanently installed, rigid displays are limited above all by the installation space and also legislation (JAMA—Japan Automobile Manufacturers Association).

It is proposed to use a flexible display and kinematics (that is to say a pivot mechanism) which, in a space-optimized manner, can represent different display sizes in the vehicle.

In the not-in-use state (that is to say in a stowed position), the entire display is located in a cassette (that is to say in a housing). The entire unit (that is to say the display apparatus) can be understood as being a closed system. That is to say, all the mechanical and electrical components function without further additional components. The unit can thus be installed at different locations in the vehicle (control panel, seat, etc.) and also functions outside a vehicle geometry (in the case of an external power supply).

The display can be deployed continuously variably via its own drive (that is to say a motor). The rear end of the screen unit (that is to say the foot region of the screen device) is thereby pushed out of the cassette and pulled in again by a drive, for example. In every position, the kinematics (that is to say the pivot mechanism) provides a stable state which allows touch operation. This is achieved on the one hand via a flexible support structure (that is to say via a carrier layer with inherent stiffness and a notched region) and additionally via rotation/push guiding kinematics located behind the display (that is to say via the arrangement of the stabilizing elements of variable length in an oblong hole). A specific rotation angle (e.g. 80°) must thereby not be exceeded, since otherwise self-locking (that is to say canting) occurs. At the upper end (that is to say in the head region) of the flexible support structure there is an approximately 30 mm long non-flexible portion, to which part of the kinematics is fastened. It is also conceivable that the rotation/push guiding kinematics has an additional, supporting drive.

The flexible display is fastened, for example adhesively bonded, to the front side of the flexible support structure. The adhesive has damping properties and can absorb certain shear forces in order, for example, to compensate relative movements between the support structure and the display.

The display device and motor vehicle described herein give rise to a number of advantages. On the one hand, the kinematics is of simple mechanical construction and is thus low maintenance. In addition, the display apparatus occupies little installation space. The representation (presentation) of the display apparatus in the motor vehicle is implemented in an attractive manner. Display sizes are adjustable as required and touch operation is possible in any position.

Overall, the examples show how it is possible to provide a display apparatus which permits the production of variable screen sizes, wherein touch operation is possible with each adjusted screen size, and which in a stowed state occupies as little space as possible.

A description has been provided with reference to various examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:
1. A display device for displaying pixel-based display content, the display device comprising:

a flexible screen device, movable between a stowed position in a housing along a circular arc of the housing, in which the flexible screen device is bent in the housing along the circular arc of the housing to be stowed in the housing along the circular arc, and a use position, in which the flexible screen device protrudes at least partially from the housing; and a pivot mechanism configured to move the flexible screen device between the stowed position and the use position, based on a control signal, the pivot mechanism including:

a motor, and a pivot arm mounted at a first end region on a foot region of the flexible screen device and pivotable about an axis of rotation along the circular arc of the housing, the pivot arm being configured to receive a torque from the motor to move the foot region along the circular arc, a radius of the circular arc corresponding to a length of the pivot arm, to thereby alternately push the flexible screen device into the use position and pull the flexible screen device into the stowed position in a displacement direction.

2. The display device according to claim 1, wherein the pivot mechanism is disposed inside the housing and is configured to push the flexible screen device continuously variably, based on the control signal, from the stowed position into an intermediate position and to hold the flexible screen device in the intermediate position.

3. The display device according to claim 1, wherein
the flexible screen device includes a carrier layer and a display layer which are bonded together to form a flexible layer composite,
the carrier layer is curvable and includes a surface remote from the display layer with notches, and
the surface of the carrier layer with notches has a smaller radius of curvature than a surface bonded to the display layer.

4. The display device according to claim 1, wherein
the flexible screen device in the stowed position is held mechanically preloaded in a bent position, and
the flexible screen device in the use position is mechanically relaxed and thereby straight.

5. The display device according to claim 1, wherein the flexible screen device includes a touch-sensitive sensor layer.

6. The display device according to claim 1, further comprising a stabilizing element of variable length having a first end region connected to the flexible screen device and a second end region, opposite of the first end region, rotatably mounted about an axis of rotation, the stabilizing element being configured to, on movement of the flexible screen device between the stowed position and the use position, to vary the length of the stabilizing element according to a position of the flexible screen device and to support the flexible screen device against a force acting along the axis of rotation.

7. The display device according to claim 6, wherein the stabilizing element is guided in an oblong hole provided in a head region of the flexible screen device, opposite the foot region, the oblong hole extending perpendicularly or obliquely to the displacement direction of the flexible screen device.

8. The display device according to claim 7, wherein a profile of the oblong hole has a shape of a roof.

9. The display device according to claim 6, wherein the stabilizing element is a telescopic arm.

10. A motor vehicle, comprising:
a chassis; and
a display device, the display device including:
a flexible screen device, movable between a stowed position in a housing along a circular arc of the housing, in which the flexible screen device is bent in the housing along the circular arc of the housing to be stowed in the housing along the circular arc, and a use position, in which the flexible screen device protrudes at least partially from the housing, and
a pivot mechanism configured to move the flexible screen device between the stowed position and the use position, based on a control signal, the pivot mechanism including:
a motor, and
a pivot arm mounted at a first end region on a foot region of the flexible screen device and pivotable about an axis of rotation along the circular arc of the housing, the pivot arm being configured to receive a torque from the motor to move the foot region along the circular arc, a radius of the circular arc corresponding to a length of the pivot arm, to thereby alternately push the flexible screen device into the use position and pull the flexible screen device into the stowed position in a displacement direction.

11. The motor vehicle according to claim 10, wherein the pivot mechanism is disposed inside the housing and is configured to push the flexible screen device continuously variably, based on the control signal, from the stowed position into an intermediate position and to hold the flexible screen device in the intermediate position.

12. The motor vehicle according to claim 10, wherein
the flexible screen device includes a carrier layer and a display layer which are bonded together to form a flexible layer composite,
the carrier layer is curvable and includes a surface remote from the display layer with notches, and
the surface of the carrier layer with notches has a smaller radius of curvature than a surface bonded to the display layer.

13. The motor vehicle according to claim 12, wherein
the carrier layer includes in a head region, a foot region, and a notch region disposed between the head region and the foot region of the carrier layer,
the notches are provided in the notch region, and extend in a direction perpendicular to or obliquely to the displacement direction, and
the head region and the foot region of the carrier layer have a stiffness greater than a stiffness of the notch region.

14. The motor vehicle according to claim 10, wherein
the flexible screen device in the stowed position is held mechanically preloaded in a bent position, and
the flexible screen device in the use position is mechanically relaxed and thereby straight.

15. The motor vehicle according to claim 10, wherein the flexible screen device includes a touch-sensitive sensor layer.

16. The motor vehicle according to claim 10, further comprising a stabilizing element of variable length having a first end region connected to the flexible screen device and a second end region, opposite of the first end region, rotatably mounted about an axis of rotation, the stabilizing element being configured to, on movement of the flexible screen device between the stowed position and the use position, to vary the length of the stabilizing element according to a position of the flexible screen device and to support the flexible screen device against a force acting along the axis of rotation.

17. The motor vehicle according to claim 16, wherein the stabilizing element is guided in an oblong hole provided in a head region of the flexible screen device, opposite the foot region, the oblong hole extending perpendicularly or obliquely to the displacement direction of the flexible screen device.

18. The motor vehicle according to claim 17, wherein a profile of the oblong hole has a shape of a roof.

19. The motor vehicle according to claim 16, wherein the stabilizing element is a telescopic arm.

20. The motor vehicle according to claim 10, further comprising an instrument panel in which the display device is installed.

\* \* \* \* \*